Sept. 13, 1960　　　D. F. BALMER ET AL　　　2,952,747
PORTABLE DICTATION MACHINE
Filed Aug. 24, 1956　　　　　　　　　　　　10 Sheets-Sheet 6
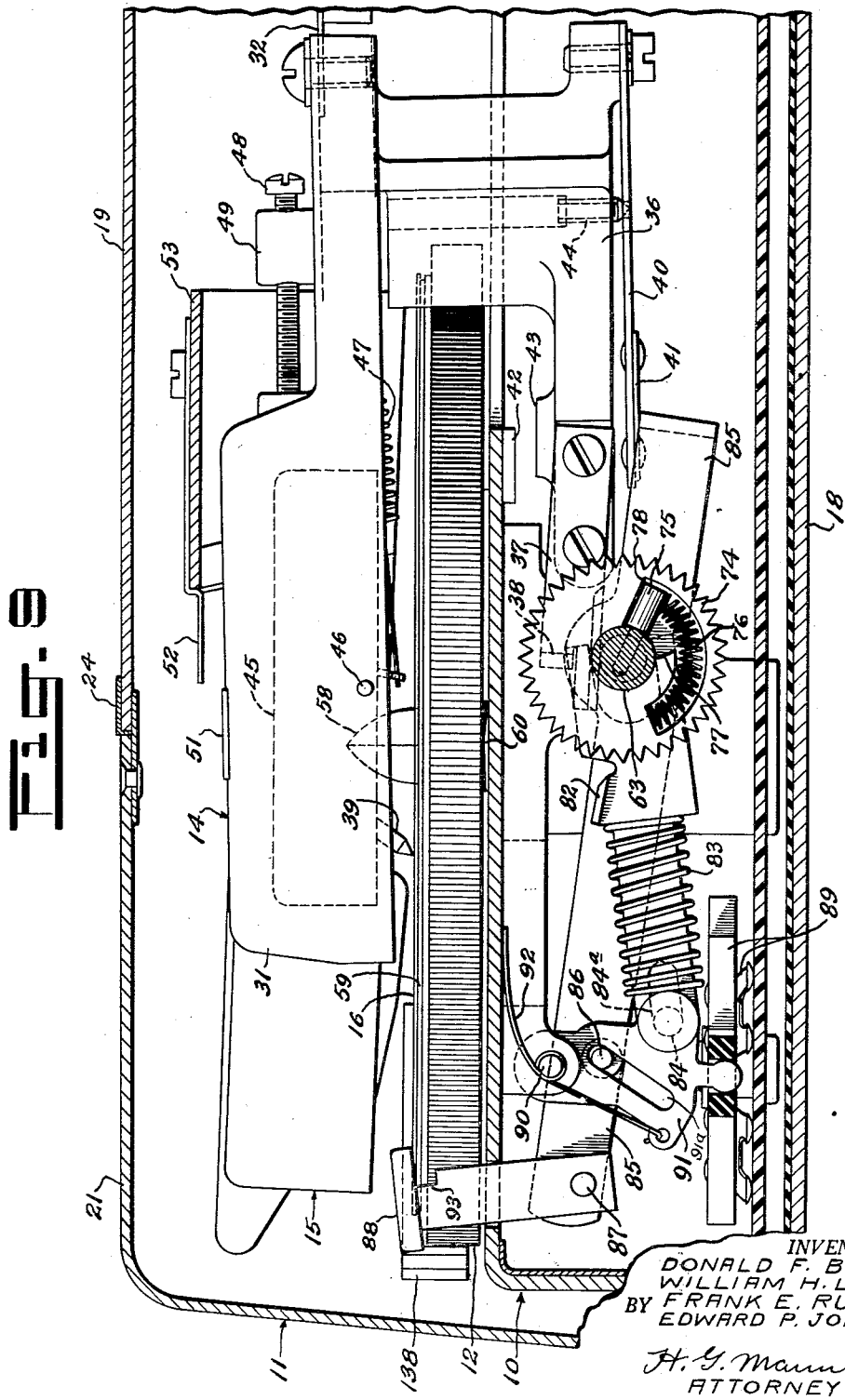
INVENTORS
DONALD F. BALMER
WILLIAM H. LYON
BY FRANK E. RUNGE
EDWARD P. JOHNSON
H. G. Manning
ATTORNEY

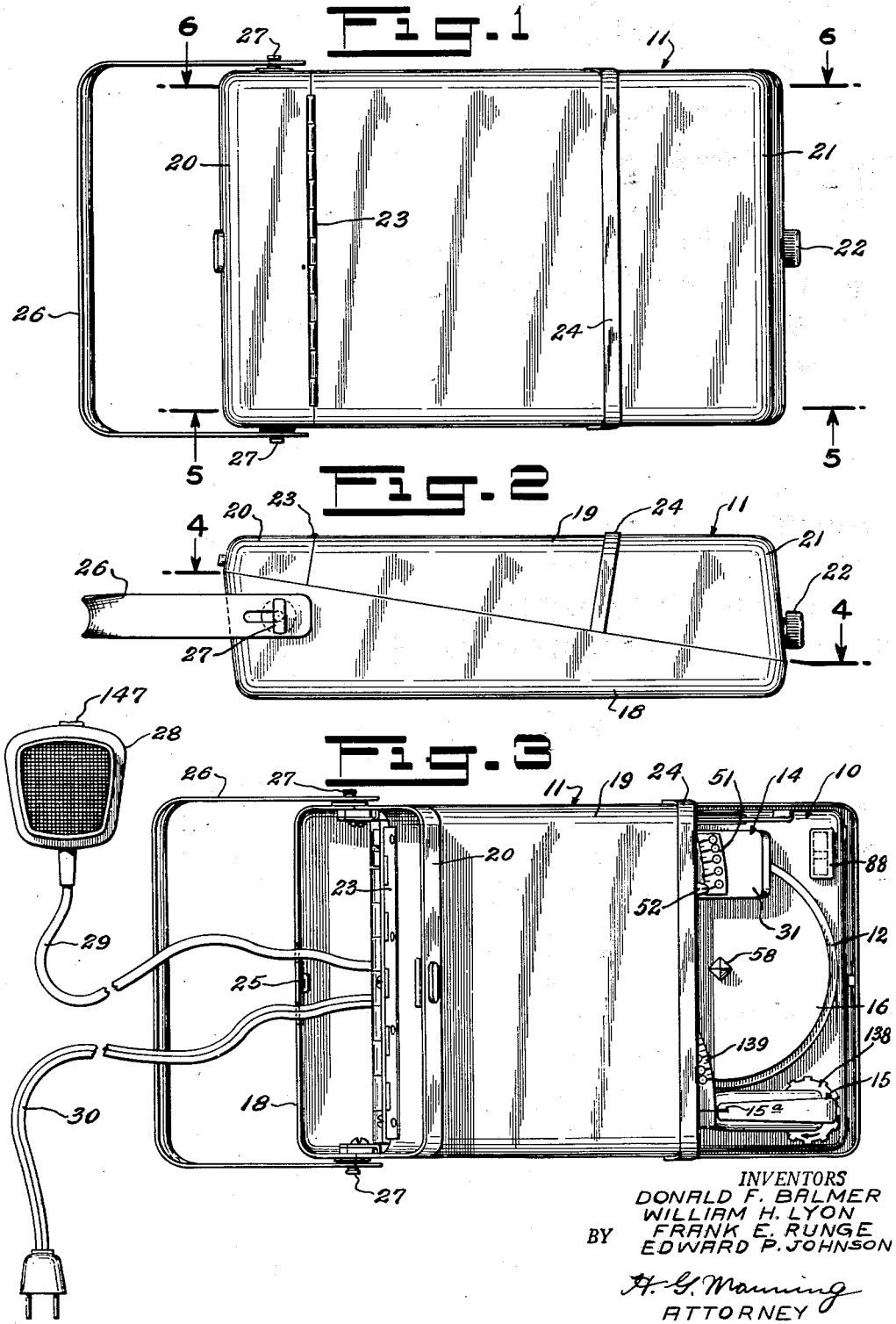

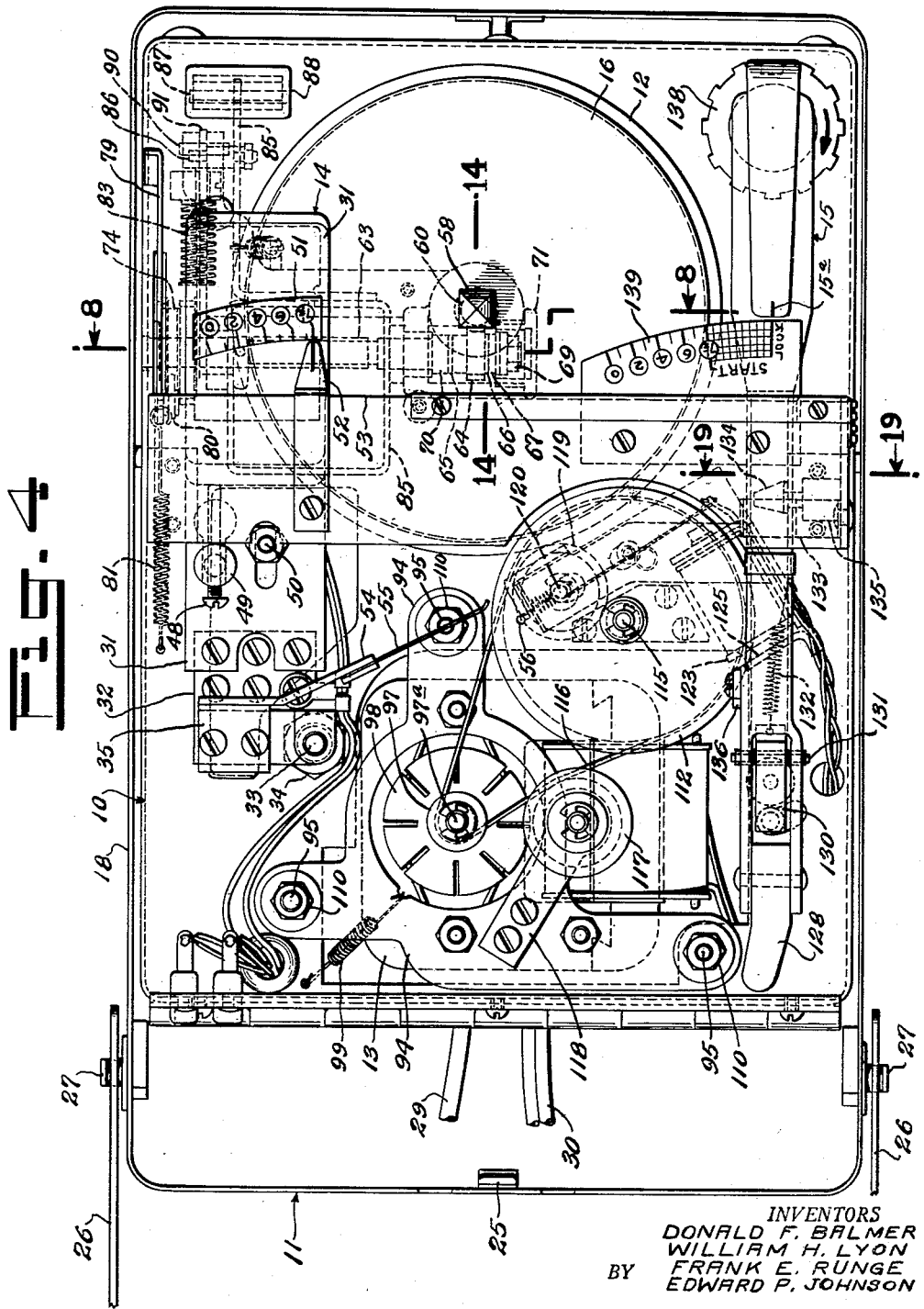

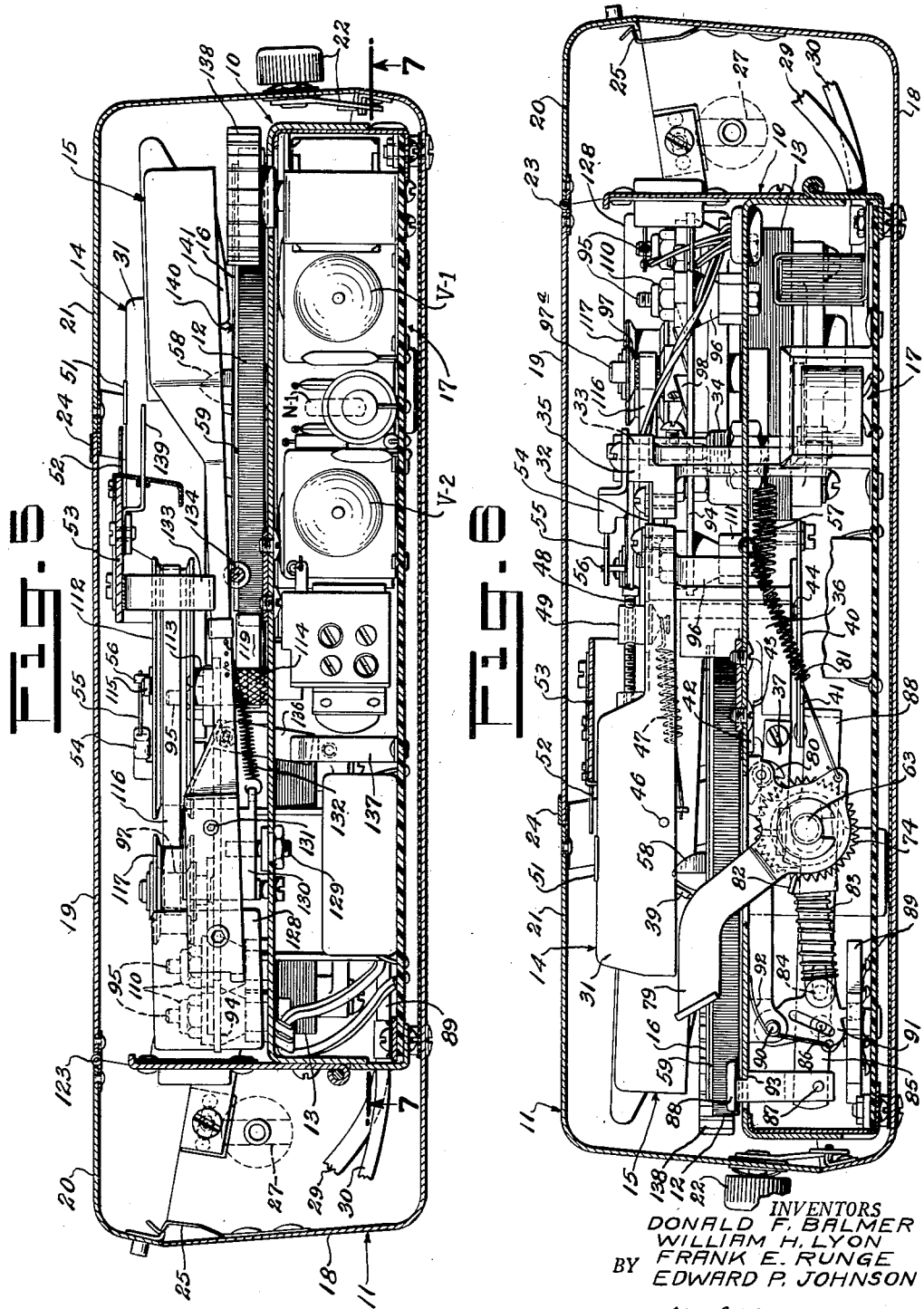

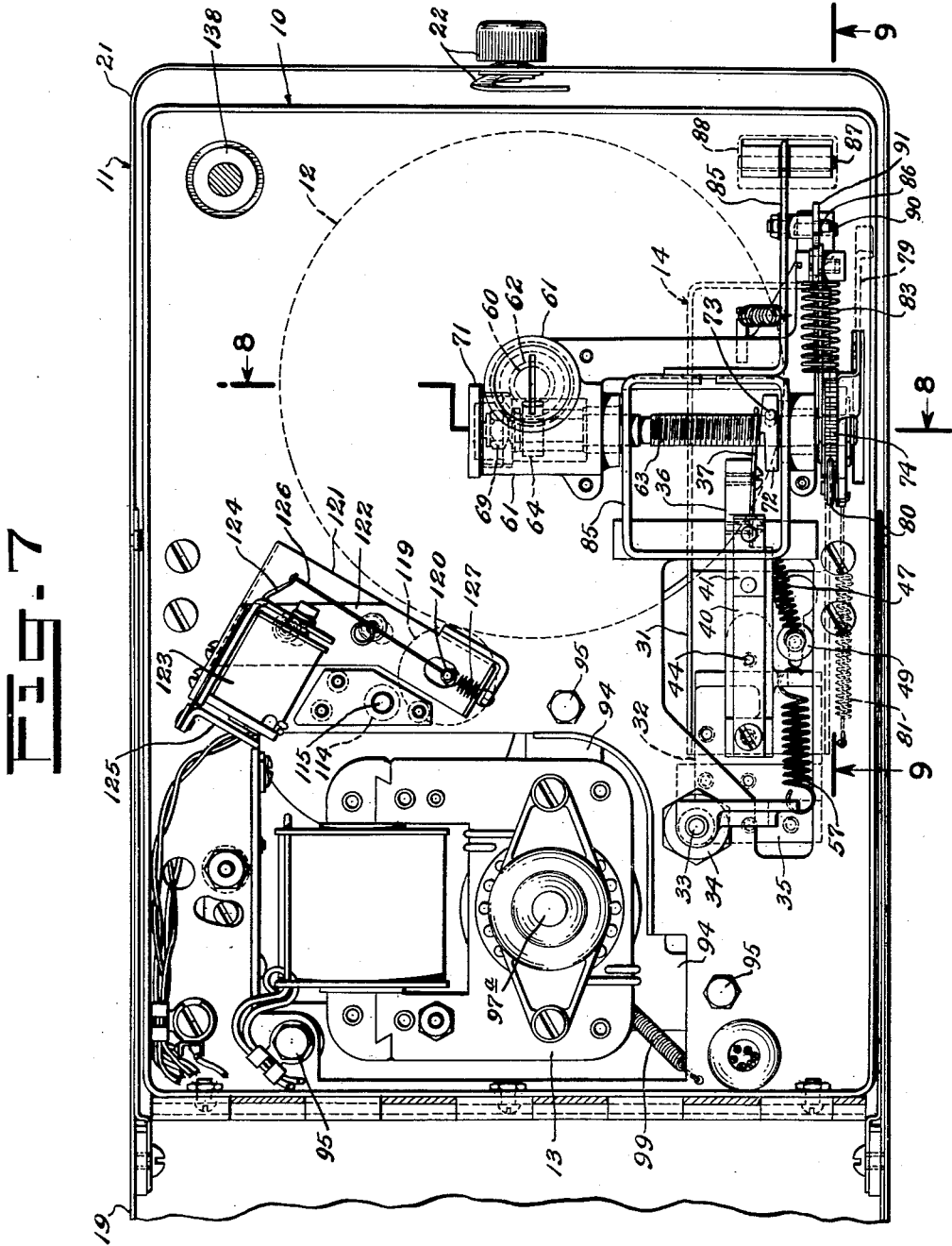

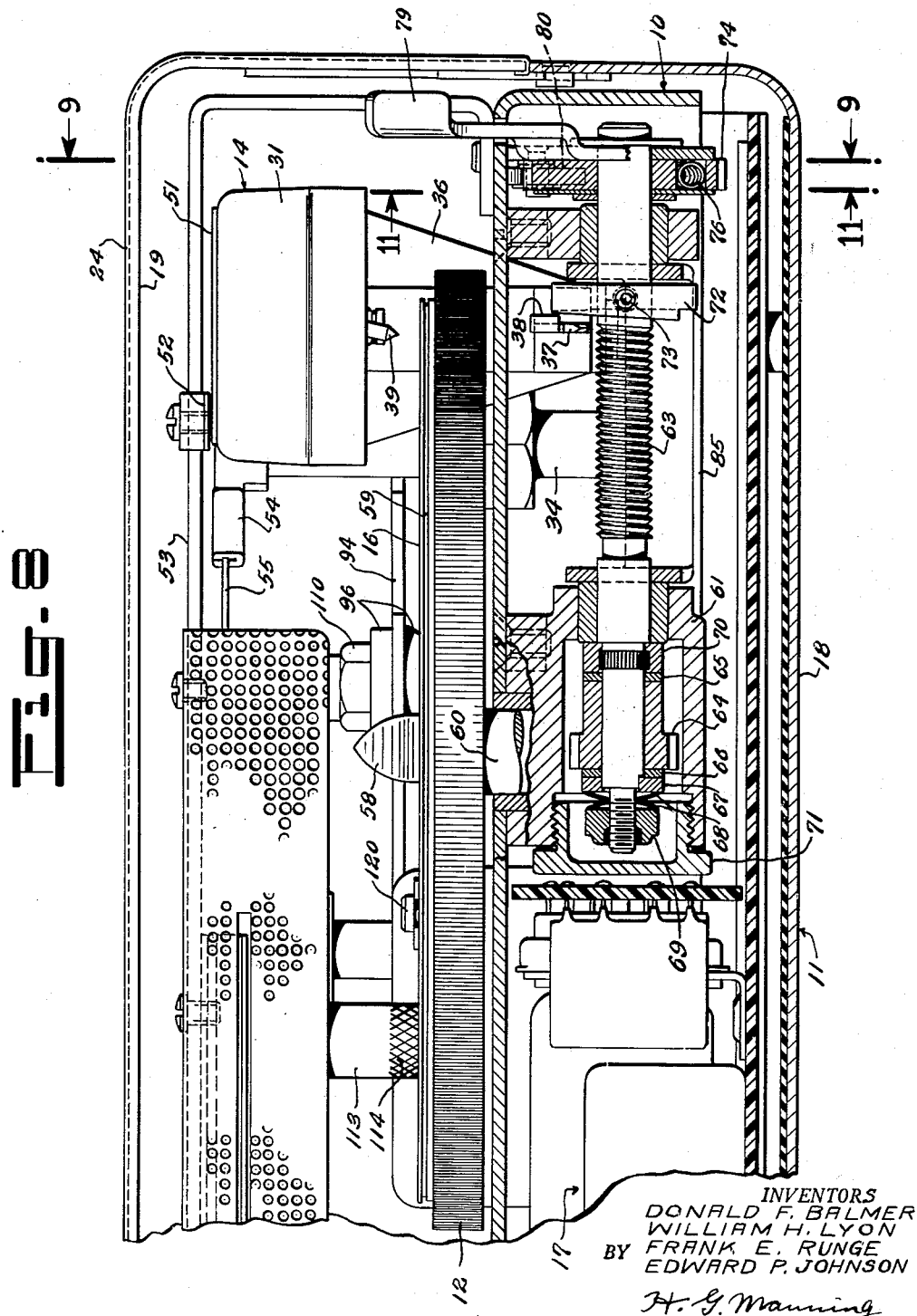

INVENTORS
DONALD F. BALMER
WILLIAM H. LYON
BY FRANK E. RUNGE
EDWARD P. JOHNSON

H. G. Manning
ATTORNEY

Sept. 13, 1960  D. F. BALMER ET AL  2,952,747
PORTABLE DICTATION MACHINE

Filed Aug. 24, 1956  10 Sheets-Sheet 8

INVENTORS
DONALD F. BALMER
WILLIAM H. LYON
FRANK E. RUNGE
EDWARD P. JOHNSON
BY
H. G. Manning
ATTORNEY

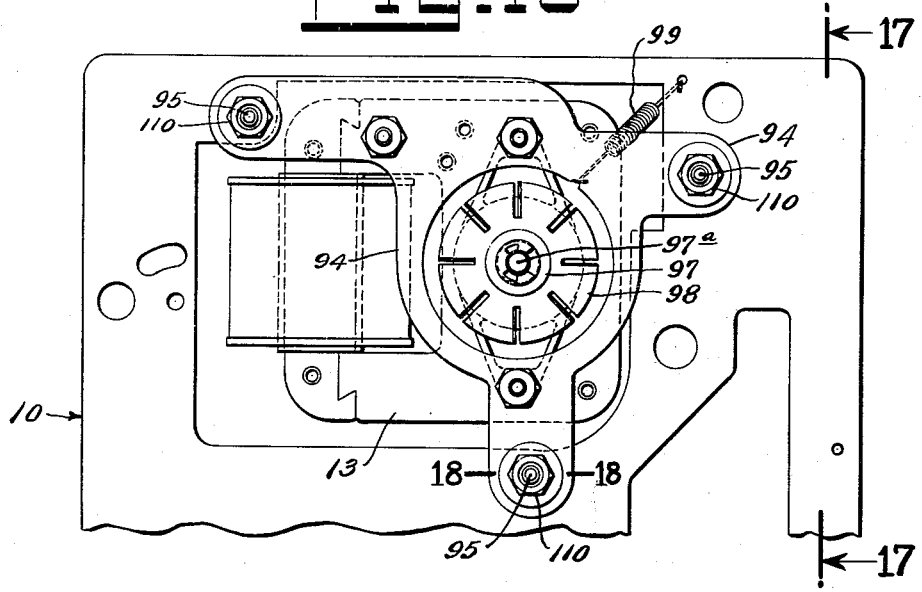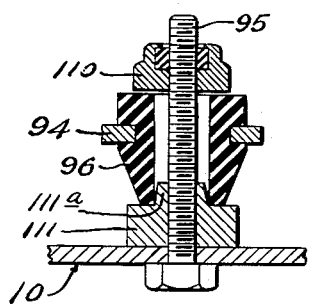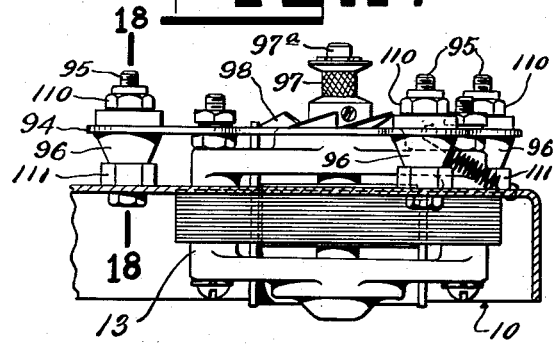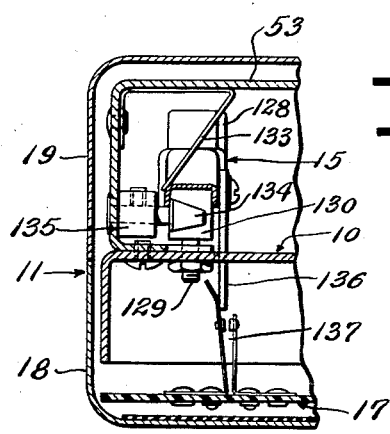

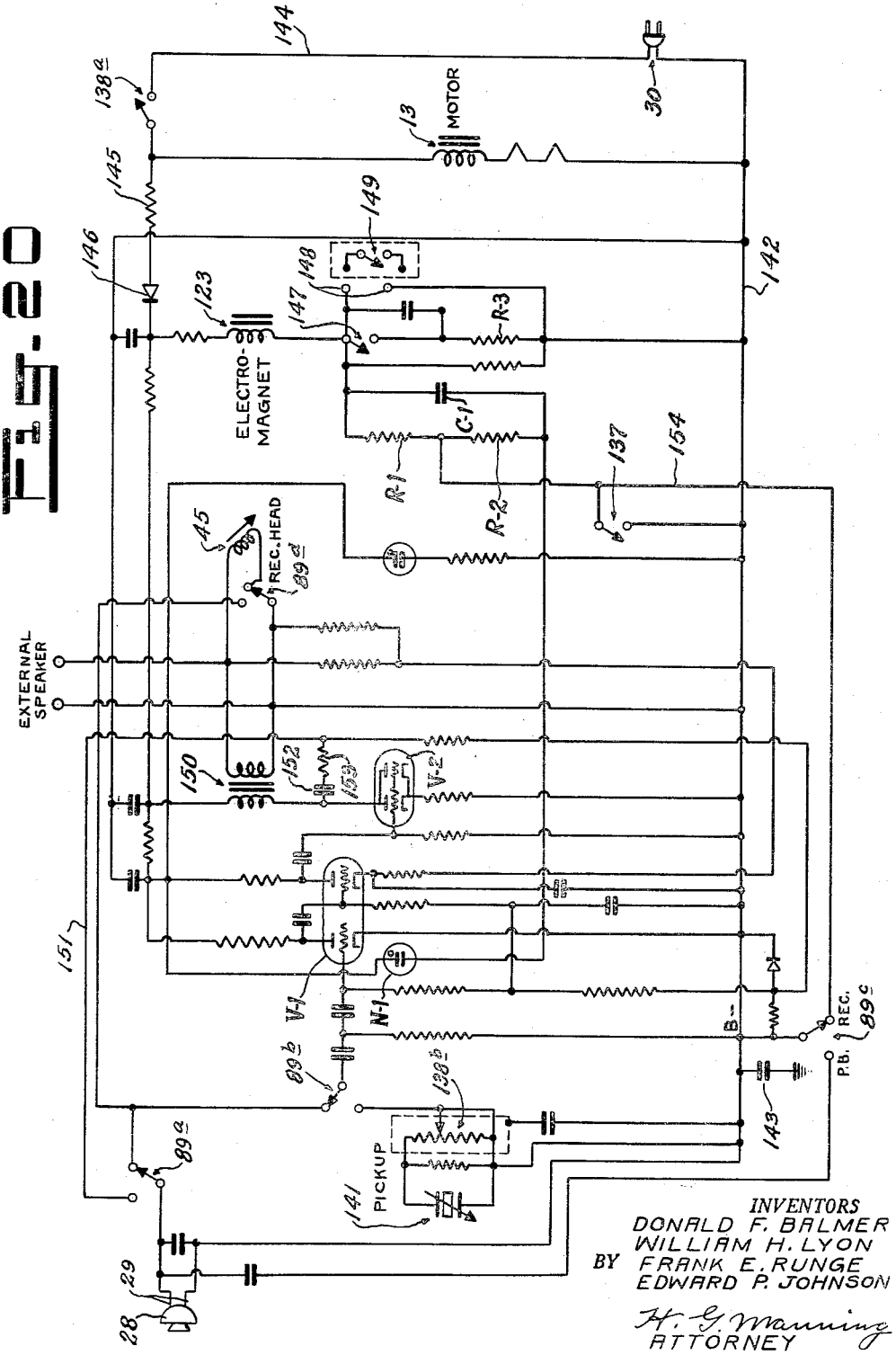

United States Patent Office 2,952,747
Patented Sept. 13, 1960

2,952,747

PORTABLE DICTATION MACHINE

Donald F. Balmer, East River, William H. Lyon, Orange, Frank E. Runge, Branford, and Edward P. Johnson, East Haven, Conn., assignors to The Soundscriber Corporation, New Haven, Conn., a corporation of Connecticut Filed Aug. 24, 1956, Ser. No. 606,128

18 Claims. (Cl. 179—100.4)

This invention relates to sound recording and reproducing machines, and more particularly to a dictating machine of the type wherein a thin plastic disk is embossed by a recording head which forms a spiral sound track upon the surface of the disk.

One object of this invention is to provide a dictating machine of the above nature, which is self-contained in a lightweight small sized case.

Another object is to provide a dictating machine of the above nature, having novel feeding means for the recording head which enables the recording of the sound track to be temporarily interrupted and later resumed without destroying the continuity of the recording.

A further object is to provide means to produce an audible warning signal for dictating machines of the above nature to indicate when the controls are improperly set for the recording operation, so as to warn the user against attempting the record dictation under such conditions.

A further object is to provide a device of the above nature which will be simple in construction, inexpensive to manufacture, easy to install and manipulate, compact, ornamental in appearance, and very efficient and durable in use.

With these and other objects in view, there has been illustrated in the accompanying drawings one form in which the invention may conveniently be embodied in practice.

In the drawings,

Fig. 1 represents a top view of one form of lightweight portable dictating machine embodying the present invention.

Fig. 2 is a side view of the same.

Fig. 3 is a top view of the same with the front and back covers in open position, and with a microphone and power cable assembled ready for use.

Fig. 4 is a horizontal sectional view of the dictating machine, on a somewhat enlarged scale, taken on the line 4—4 of Fig. 2.

Fig. 5 is a vertical cross-sectional view of the same taken on the line 5—5 of Fig. 1.

Fig. 6 is a vertical cross-sectional view of the same, taken on the line 6—6 of Fig. 1.

Fig. 7 is a horizontal cross-section, taken on the line 7—7 of Fig. 5 looking upwardly.

Fig. 8 is a fragmentary vertical cross-section, on a still larger scale, taken on the line 8—8 of Fig. 7.

Fig. 9 is a fragmentary vertical cross-section, taken on the line 9—9 of Fig. 8.

Fig. 16 is a fragmentary top view, showing the mounting for the driving motor.

Fig. 17 is a fragmentary vertical cross-section, taken on the line 17—17 of Fig. 16.

Fig. 18 is a fragmetnary vertical cross-section on an enlarged scale, taken on the line 18—18 of Fig. 17.

Fig. 19 is a fragmentary vertical cross-section, taken on the line 19—19 of Fig. 4, and Fig. 20 is a schematic diagram of the electrical circuits.

Figure 10:
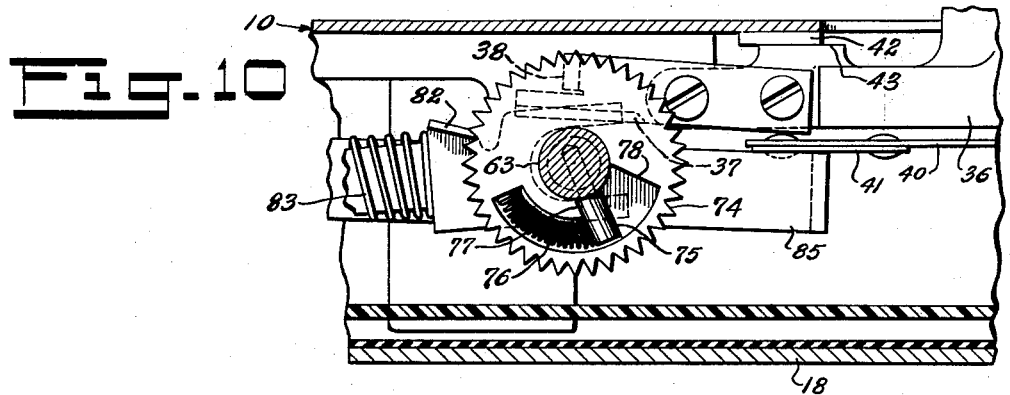
Fig. 10 is a fragmentary sectional view of the same, showing the indexing mechanism for the recording head.

Referring now to the drawings, in which like reference numerals denote corresponding parts throughout the several views, the numeral 10 indicates a chassis which supports a motor 13, a turntable 12, a recording arm 14, a playback arm 15, and a recording disk 16. Attached to this mechanical assembly is an amplifier assembly 17, both assemblies being housed in a cabinet 11 which consists of a lower section 18 and an upper section 19 rigidly secured to the lower half 18.

A rear compartment cover 20 is joined to the upper section 19 of the cabinet 11 by a hinge 23 to provide a compartment designed to contain a microphone 28, its associated cable 29, and a power cable 30.

The rear cover is secured in place by a releasable snap lock 25.

A detachable front cover 21 is also provided to protect the operating controls of the equipment, said front cover 21 being held in place by a manually operated releasable cover lock 22. A decorative band 24 forms an offset flange to receive the rear edge of the cover 21. A pivoted handle 26 is attached to the bottom section 18 of the cabinet by button fasteners 27.

The recording arm 14 is located on the right-hand side of the machine, and consists of a recording arm shell 31, a downward extension 36, and a knife edge 37, which is attached to the extension 36. (See Figs. 6, 8 and 9.)

A recording head 45 (Fig. 9) is mounted by means of a pivot pin 46 inside the recording shell 31.

The necessary recording pressure is applied to a stylus 39 by a coiled spring 47. Adjustment of the stylus pressure on the record may be made manually by a horizontal screw 48 and an associated adjustment slide bracket 49.

The recording arm assembly is attached by means of a flexible strip hinge 32 secured to a recording arm bracket 35 (Fig. 6), which is secured to a vertical stanchion 34 attached to the chassis 10 by means of a pivot pin 33.

Downward pressure is applied to the arm 14 and the knife edge 37 by means of a horizontal coil spring 57 which holds the knife edge 37 in firm contact with a horizontal lead screw 63 (Fig. 8) during the recording process.

During playback, the recording arm 14 will be raised in such a manner that the recording stylus 39 will be lifted from the recording disk 16, and the knife edge 37 will be lifted from the lead screw 63. This lifting is produced by a U-shaped lifting bar 85 (Figs. 8 and 9) which is pivotally supported at each side at the ends of the lead screw 63. The lifting bar 85 has a forwardly extending arm at one side which is operated by a substantially vertical "Talk-Listen" button 88 located at the front of the chassis 10 and is pivotally connected to said arm of said bar by a pin 87. When the "Talk-Listen" button 88 is depressed and pushed rearwardly, a notch 93 (Figs. 6 and 9) on said button 88 will move under the edge of the chassis 10 and hold said button in a depressed position and will maintain the machine set for "playback" operation.

The rear end of the lifting bar 85 lies substantially parallel with the lead screw 63 and contacts a frictional nylon strip 41 (Figs. 9 and 10) attached to the underside of a flexible recording arm lifting finger 40 secured to the downward extension 36. The finger 40, when lifted by the lifting bar 85, serves to raise the recording arm shell 31 and the extension 36 until a stop bumper 43 on the recording arm 14 contacts a frictional nylon strip 42 attached to the underside of the chassis 10 (Fig. 10). When this point is reached, further motion of the lifting bar 85 merely bends the lifting finger 40 and squeezes the depending arm extension 36 between the chassis 10 and the lifting bar 85 so as to hold the recording arm 14 firmly in raised position. The arm 14 may, however, be swung horizontally over its operating range by exerting pressure manually on one side or the other, and the nylon strips 41 and 42 provide smooth friction surfaces for this action. The pressure with which the arm 14 is gripped can be varied by turning an arm lifting adjustment screw 44 by means of a wrench (Fig. 9). A recording arm level adjustment screw 50 is also provided to vary the height of the recording arm shell 31 with reference to the knife edge 37 (Fig. 4).

The turntable 12 is rim-driven by a mechanism located at the rear of the cabinet and will be described later. A tapered square rounded pin 58 is located in the center of the turntable 12 and is adapted to fit within a similar square hole in the record disk 16. A thin yieldable pad 59, preferably comprising a thin sheet of Vinylite (Fig. 8) is placed on top of the turntable 12 and provides a support for the disk 16 during recording. It also serves as a relatively soft surface for perventing injury to the stylus 39 if the latter should accidentally be dropped on the turntable when no record disk is in place.

Figures 14, 15:
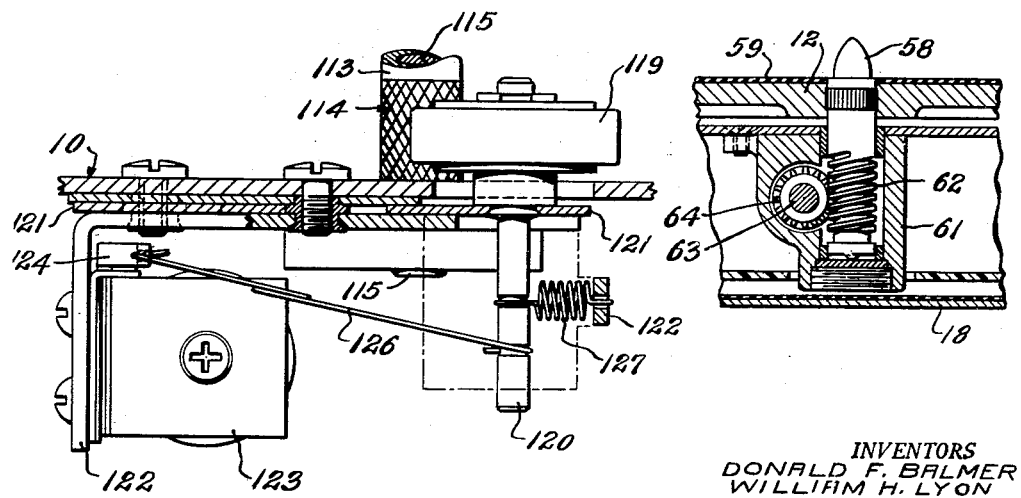
Fig. 14 is a fragmentary vertical cross-section, taken on the line 14—14 of Fig. 4.
Fig. 15 is a fragmentary vertical cross-section, on an enlarged scale, taken on the line 15—15 of Fig. 13.

The turntable 12 is attached to a vertical spindle 60 having a worm section 62 (Fig. 14). The turntable spindle 60 is supported by bearings in a gear box 61 having a cover cap 71. The lead screw 63 is supported in the same gear box 61 and is mechanically connected to the spindle worm section 62 by a driven gear 64, which turns the lead screw shaft 63, and is held firmly in position between a friction washer 65 and a friction washer 66 (Fig 8). The friction washer 65 is held firmly in contact with a collar 70, which is secured to the lead screw 63. A pressure washer 67 is held firmly against the friction washer 66 by a pair of spring washers 68 and a tightening nut 69.

The washers 65, 66, 67 and 68 comprise a clutch assembly, the compression of which can be varied by adjusting the nut 69.

It will be understood that the lead screw 63 turns when the turntable 12 is driven, and drives the recording arm 14 through the knife edge 37 when the latter is lowered into engagement with the teeth of said lead screw. At the outer extremity of the lead screw 63 provision is made of a ratchet wheel 74, which is freely mounted on the lead screw 63 and has its motion limited by a cross pin 75. (See Figs. 9-12) A pair of radial shoulder stops 77 and 78, which are a part of the ratchet wheel 74, engage the pin 75 and limit the rotation of said ratchet wheel 74 on its shaft. The stops 77 and 78 are angularly spaced by approximately forty-five degrees. By means of this construction, the lead screw 63 may turn in its operating direction (clockwise, as viewed in Fig. 9) through a forty-five degree range before it is locked to the ratchet wheel 74. As more fully described hereinbelow, the lead screw 63 will thus be advanced by an amount corresponding to slightly more than one groove on the record disk, thus providing a protective space between successive recordings. A curved over-travel coil spring 76 urges the ratchet wheel 74 in one direction so that the pin 75 normally rests against the stop 78.

When the machine is changed from "recording" to "playback," the recording arm 14 and the knife edge 37 will be raised and clamped firmly in their upper position as previously described. At the same time, a latch pawl 82 will engage the teeth of the ratchet wheel 74 and stop it from rotating. (See Figs. 9 and 10.) The rotation of the lead screw 63 clockwise (as viewed in Figs. 9 and 10), however, will not be stopped until the pin 75 has swung approximately forty-five degrees and has come into engagement with the stop 77. At this point, the lead screw 63 will stop rotating, and the drive gear 64 will start to slip on its shaft. The friction caused by this slipping loads the turntable 12, and the motor driving it, by exactly the same amount as the recording stylus 39 does during the recording process. This results in an equal load on the turntable during both recording and playback, and insures that the speed during both of these functions will be identical.

When the arm 14 is moved to the outside of the disk (toward the right, as seen in Fig. 8) for starting a new record, a bumper 38 attached to the knife edge 37 will contact a face cam 72, secured firmly to the lead screw 63 by a set screw 73, and stop the arm 14 exactly at a predetermined point. The cam 72 has an inclined face ground to exactly match the pitch of the threads on the lead screw 63 in order to insure that the knife edge 37 will stop directly above the V-bottom of a thread on the lead screw 63. Consequently, no matter in what position the lead screw 63 stops, the knife edge 37 will always be directly over the bottom of a V. this insures that the recording arm 14 will start feeding immediately when the knife edge is lowered upon the lead screw 63, at the same time that the ratchet 74 is released by the latch pawl 82, to permit the lead screw 63 to start turning. This arrangement is necessary to prevent a delayed start of the feeding of the recording arm 14, which might cause the latter to record several grooves before normal feed begins.

An index lever 79 (Fig. 8) is swingably attached with respect to the outer end of the lead screw 63, and carries a pivoted pawl 80 (see Figs. 11 and 12), which is designed to engage the teeth of the ratchet wheel 74 when the lever 79 is manually operated. The operation of the index lever 79 overdrives the lead screw 63 through the ratchet wheel 74 by "slipping" the clutch washers 65 and 66. This advances the recording arm 14 rapidly, and produces a spiral of greater than normal pitch on the disk 16, leaving a visible space between groove formations, which is used to indicate a "correction" in the dictated material. Moreover, the index lever 79 may be pushed twice to produce a double space to indicate the end of a letter, in accordance with the visible indexing system disclosed and claimed in Patent No. 2,611,620 dated September 16, 1952, to Runge, "Record Marker for Dictating Machines."

Figure 11:
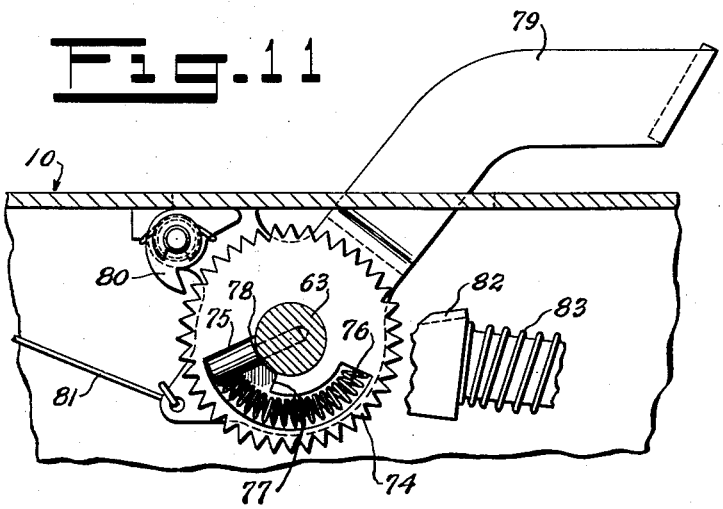
Fig. 11 is a fragmentary vertical section, taken on the line 11—11 of Fig. 8, of the mechanism shown in Fig. 10, as viewed from the opposite direction.
Figure 12:
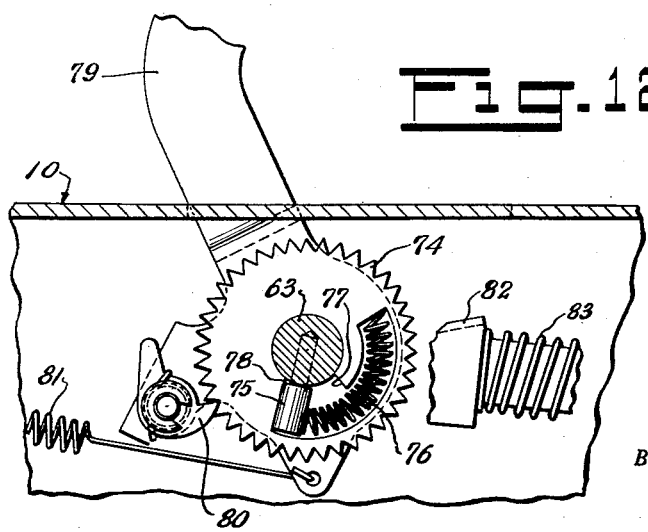
Fig. 12 is a fragmentary view similar to Fig. 11, showing the mechanism in still another position.
Figure 13:
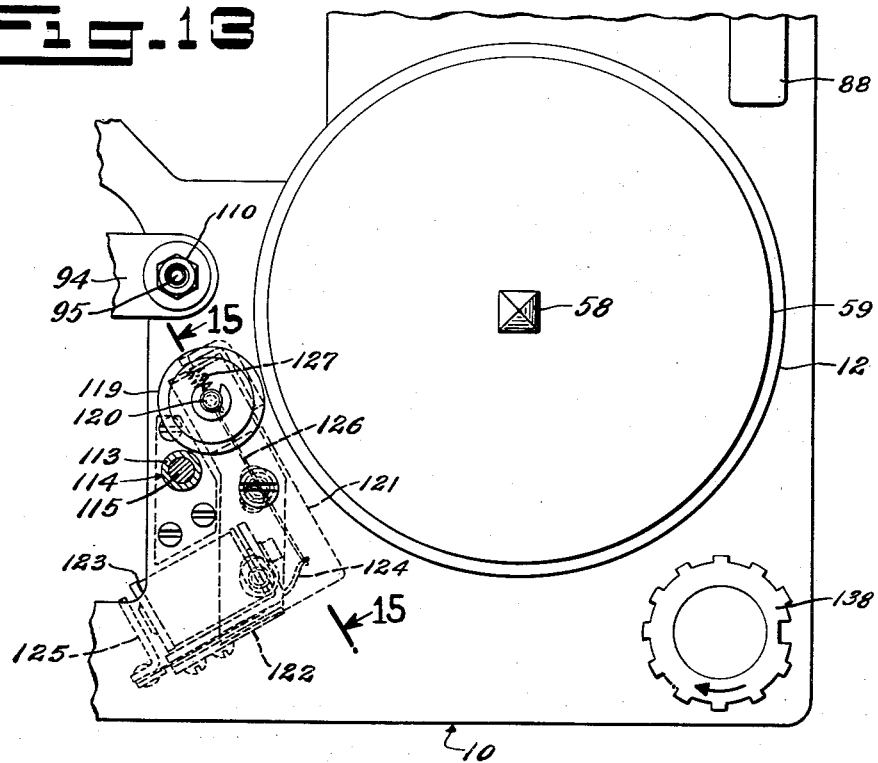
Fig. 13 is a fragmentary top view of the turntable drive mechanism.

A coiled spring 81 connected to the index lever 79 serves to return said lever to its normal position shown in Figs. 6, 11, 12.

The latch pawl 82 is operated by a bell crank lever 91 (Fig. 9), having an inclined slot 91a, to receive an operating pin 86 attached to the arm lifting bar 85. A spring 92 serves to return the bell crank lever 91 to its forward position (as shown in Fig. 9), and lifts the "talk-listen" button 88 up to its recording position. However, when the button 88 is pressed down and locked to the chassis 10 by the notch 93, the pin 86 forces the bell crank lever 91 backwardly (toward the right hand side in Fig. 9) and causes the latch 82 to engage with the ratchet wheel 74. In swinging on its pivot 90, the bell crank lever 91 will also operate the selector switch 89 which selects between recording or playback conditions of the amplifier.

The latch 82 is connected to the bell crank lever 91 by a cross pin 84 loosely received in a slot 84a. Thus if the latch 82 should accidentally strike the top of a tooth on the ratchet wheel 74, an overtravel spring 83 will take up the motion of the bell crank lever 91 and permit it to complete its normal cycle.

On top of the recording arm bracket 35, is an angular end-of-record signal arm 54 (see Figs. 4, 5, 6 and 8)

having a flexible reed 55 attached at the left hand end thereof. Thus, as the recording arm 14 moves toward the inner portion of the disk 16, the signal reed 55 will move close to the axis of a pulley 112 carrying a pin 56 which projects upwardly and repeatedly strikes the signal reed 55 when the recording arm 14 reaches the end of its recording range. This produces an audible sound to indicate to the dictator that the disk 16 is nearly recorded. A U-shaped bridge 53 is attached to both sides of the chassis 10 and extends over the arms 14 and 15 and the turntable 12. (See Figs. 4, 5, 6, 8 and 9.) Attached to the right hand part of the bridge 53 is a forwardly-extending pointer 52 which is located in proximity to a curved log scale 51 provided on the top of the recording arm 14. (See Figs. 3 and 4.)

The motor 13 is firmly held by a mounting bracket 94 (see Figs. 16, 17 and 18), and at three points on said bracket soft rubber grommets 96 are inserted, which grommets fit over three studs 95 which are firmly attached to the chassis 10. A conical portion 111a of the grommet seat 111 located on the studs 95 center each grommet 96 and leave it free to absorb motor vibration. A nut 110 holds the grommet 96 in place, and prevents it from moving upwardly when the machine is carried in other than a level position. A small pulley 97 (Fig. 4) is attached to a motor shaft 97a, which carries a notched fan blade 98 for cooling the motor 13. A spindle 115 firmly attached to the chassis 10 between the motor 13 and the turntable 12 supports a pulley 112 and its associated pulley shaft 113. (See Figs. 4, 7, 13 and 15.) A flexible rubber belt 116 connects the pulley 112 with the motor pulley 97.

The flexibility of the belt 116 insulates the vibration of the motor from the other parts of the driving system.

A coil spring 99 between the motor 13 and the chassis 10 compensates for the pull of the belt 116 and permits the three grommets 96 to remain centered on their conical supports 111a (Fig. 18). An idler pulley 117 (Fig. 4) attached to the motor 13 by a bracket 118 rides against the belt 116 and takes up its slack.

A rubber tired idler wheel 119 (Fig. 4) transmits the rotation of the driving surface 114 on the shaft 113 to the edge of the turntable 12. This idler wheel 119 is supported by a shaft 120 fixed to a slide plate 121 (Figs. 7, 13 and 15) sandwiched between the chassis 10 and a bracket 122 mounted under the chassis 10. An armature 125 (Figs. 7 and 13) of an electro-magnet 123 is connected to the shaft 120 through an arm 124 and a wire spring link 126 (Fig. 15). Thus, when the electro-magnet 123 is energized, the rubber drive wheel 119 will be pulled into contact with the turntable 12 and the end driving surface 114 of the pulley shaft 113 will rotate said turntable. A coil spring 127 serves to disengage the rubber tired wheel 119 from the turntable 12 when the electro-magnet 123 is deenergized.

The playback arm 15 (Figs. 4 and 5) is located on the left-hand side of the machine chassis 10 and is supported on a horizontal pivot pin 131 attached to a mounting block 130 which, in turn, is supported by a vertical pivot pin 129 attached to the chassis 10. The arm 15 is counterbalanced by a rear weight 128 (Figs. 4 and 5).

Downward pressure is exerted on the playback arm 15 by a coil spring 132, and a playback head 141 (Fig. 5) is securely mounted in the forward part of the arm 15. A playback stylus 140, which is secured to the head 141, is located in such a way that it follows freely the grooves recorded on the disk 16. A flat leaf spring 133 (Fig. 19) attached to the bridge 53 is located above an arm support cone 134 which is attached to the bridge 53 by a block 135. The combination of the cone 134 and the spring 133 provides a lock for the arm 15, when it is not in use. The cone 134 facilitates the sliding of the arm 15 downwardly and drops the stylus 140 at the proper starting point on the disk record for playback.

A switch actuator 136 (Fig. 19), is attached to the arm 15 and projects below the chassis 10. This actuator 136 opens a leaf switch 137 when the playback arm is in the "rest" position. The switch 137 controls an alarm circuit that warns the operator when the machine is not in recording position. The leaf switch 137 is attached to and forms a part of the amplifier assembly 17.

A volume control knob 138 (Figs. 4 and 13) is located on the forward left-hand corner of the chassis 10. A log scale 139 is attached to the bridge 53 and is located above the playback arm 15 in proximity to an indicating mark 15a thereon.

*Circuit diagram*

A diagram of the electrical circuits is shown in Fig. 20 of the drawings. Thus, the power cable 30 which enters the back of the lower cabinet section 18 (as shown in Fig. 3) has one lead 142 which forms a common connection, and is connected to the chassis 10 by a capacitor 143. The other connection 144 from the power cable 30 goes directly to the main switch 138a which is manually operated by the volume control knob 138, together with the volume control resistor 138b, in a manner well known in the art.

Closing the switch 138a will connect the field of the motor 13 directly across the source of energy represented by the leads 142 and 144, and also establishes a circuit with a voltage dropping resistor 145, connected to a rectifier 146, which in turn supplies the positive plate potential for the vacuum tubes V–1 and V–2. The electro-magnet 123 is also connected between the positive side of the rectifier 146 and the common connection 142, and its operation is controlled by a manually operable switch 147 which is positioned in the casing of the microphone 28, as shown in Fig. 3.

A pair of external leads 148 may also be provided for connection with a foot pedal switch 149 or other external switch means, if desired.

The selector switch 89 comprises four ganged single pole double throw switches indicated at 89a, 89b, 89c, and 89d in Fig. 20, said switches being shown in this figure in recording position.

One side of the microphone 28 is connected to the common connection 142, while the other side of the microphone is connected to the movable contact of the switch 89a, and to one of the fixed contacts of the switch 89c. In the recording position, a circuit will be established through the switch 89a with a fixed contact of switches 89b and 89d, the latter two switches being so arranged that in the recording position a circuit will be established through the switches 89a and 89b from the microphone 28 to the first control grid of the vacuum tube V–1.

The recording head 45 is energized by a transformer 150 which is connected in the output circuit of the vacuum tube V–2, and the connection between the transformer 150 and the recording head 45 is controlled by the switch 89d. When the switch 89d is in the playback position, it connects with a wire which leads to the fixed contacts of switches 89a and 89b, at which time the recording section of said switches will be inactive.

One side of the pickup 141 is connected to the common connection 142, while the other side is connected through the variable resistor 138b to a fixed contact of the switch 89a, so that when this latter switch is in its playback position, the pickup 141 will be connected to the control grid of the vacuum tube V–1, instead of the microphone 28. When this shift is made by the selector switch 89, the microphone 28 will then be connected, by the shifting of the switch 89a to its playback position, to a lead 151, which in turn connects with the output of vacuum tube V–2 through a capacitor 152 and a resistor 153, under which conditions, the microphone 28 will act as a speaker to reproduce the sound received by the pickup 141.

The shifting of the switch 89 to the playback position also actuates the switch 89d to disconnect the recording head 45 from the output transformer 150 and also actuates the switch 89c to establish the operating conditions for a warning signal, which will now be described.

The purpose of this warning signal is to notify the operator of the machine that he should not dictate when the selector switch 89 is in the playback condition, and the pickup arm 15 is in on its rest. This warning signal comprises an audio frequency tone which will be emitted by the microphone 28, under the conditions just mentioned, if the microphone switch 147 is manually closed, under the mistaken impression that the machine is ready to take dictation. This audio frequency tone is produced by a relaxation oscillator which is electrostatically coupled to the input of the amplifier circuit associated with the vacuum tubes V-1 and V-2. This oscillator consists of a gaseous discharge tube N-1, the resistors R-1 and R-2, and the capacitor C-1, connected to the current supplied from the rectifier 146.

A connection 154 from the junction between the resistors R-1 and R-2 leads to one side of the switch 137 and to a fixed contact of the switch 89c, so that when the selector switch 89 is in the recording position, the switch 89c will connect the junctions of R-1 and R-2 with the common connection 142, under which conditions the oscillator circuit will not function. Similarly, if the switch 137 is closed, which will be the case, whenever the pickup arm 15 is off the cone rest 134, the oscillator circuit will be grounded regardless of the position of the switch 89c, so that no warning signal will occur if the pickup arm is on the disk 16. However, as long as the switch 137 is open and the switch 89c is in the playback position, if the microphone switch 147 is closed, a circuit will be established through the resistor R-3 to the common connection, which will cause the gaseous discharge tube N-1 to alternately become conductive and non-conductive, at intervals of time corresponding to some audible frequency. The tube N-1 is physically positioned (as shown in Fig. 5), in close proximity to a portion of the input circuit of the amplifier, preferably, the control grid or the contact pin leading from the vacuum tube V-1 thereto. This electrostatic coupling between the tube N-1 and the grid of the tube V-1 is sufficient to produce an audible tone in the microphone 28.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In a recording machine for impressing a sound track in a disk recording medium, means to move said recording medium, means to mount a recording head for linear movement in contact with said recording medium, and to be moved into and out of contact with said medium to interrupt said recording, a threaded lead screw for advancing said recording head while in contact with said medium, means to rotate said lead screw at a rate proportional to the movement of said medium including means to restrict said rotation when said recording head is out of contact with said medium, a member connected to said recording head and engageable with the thread of said lead screw to advance said recording head at a rate proportionate to the speed of rotation of said lead screw, said means to restrict rotation of said lead screw including means to disengage said member from said thread for stopping said advancement of said recording head, and also including lost motion means to allow a predetermined amount of angular rotation of said lead screw of less than one-half a turn after said disengagement of said member.

2. In a traversing mechanism for a phonographic recording head, a lead screw, slipping clutch means to rotate said screw, means for driving said slipping clutch, positive clutch means, means to actuate said positive clutch means, and lost motion means connecting said positive clutch means and said lead screw, said positive clutch means being operative when actuated, to stop said lead screw after a predetermined amount of rotation of less than one-half turn limited by said lost motion means.

3. In a traversing mechanism for a recording head, a lead screw, slipping clutch means to rotate said screw, means to drive said slipping clutch means, a rotatable member, lost motion means connecting said rotatable member with said lead screw, an element movable into and out of clutching engagement with said rotatable member, said rotatable member being operative, when clutched by said movable element, to stop said lead screw after a predetermined amount of rotation of less than one-half turn limited by said lost motion means.

4. In a traversing mechanism for a phonograph recording head, a lead screw having a shaft, slipping clutch means to rotate said screw, means to drive said slipping clutch, a member loosely mounted for rotation on said lead screw shaft, spring means connected between said rotatable member and said lead screw shaft to yieldably urge rotation of said member with said shaft, an element movable into clutching engagement with said rotatable member, and stop means to limit the amount of yielding of said spring means, said rotatable member when clutched, being operable to stop said lead screw after a predetermined amount of rotation of less than one-half turn.

5. In a mechanism for linearly advancing a recording head, a lead screw, slipping clutch means to drive said lead screw, means to drive said slipping clutch means at a predetermined rate of speed in one direction, means to engage and disengage said recording head and said lead screw, one-way lost motion means connected with said lead screw to advance said lead screw and said recording head at a rate of speed greater than said predetermined rate of speed, and positive clutching means connected with said engaging and disengaging means and said one-way lost motion means, operative when said recording head is disengaged, to rotate said screw by an amount of less than one-half turn and limited by said lost motion means, and thereafter release said lead screw when said recording head is engaged.

6. In a mechanism for linearly advancing a recording head, a lead screw, slipping clutch means to drive said lead screw, means to drive said slipping clutch means at a predetermined rate of speed in one direction, means to engage and disengage said recording head and said lead screw, a toothed member loosely rotatable on said lead screw shaft to the extent of less than one-half turn with respect thereto, stop means to limit relative rotation of said toothed member and said lead screw in one direction, ratchet means engageable with said toothed member to rotate said lead screw in said first direction, and a member connected with said engaging and disengaging means for the recording head to positively engage said toothed member when said recording head is disengaged from said lead screw.

7. In a dictating machine for use with a combination microphone and sound reproducer having a recording medium movable in one direction, and transducer means to coact with said recording medium movable transversely thereof, lead screw means, means to rotate said lead screw at a rate proportional to the rate of movement of said recording medium, electrical amplifier means having input and output connections, switch means having one position to connect said combination microphone and sound reproducer to the input of said amplifier, and a second position to connect said reproducer to the output of said amplifier, an element connected to said transducer means and movable radially with respect to said lead screw into a first position in engagement with the thread of said lead screw, stop means comprising a ratchet gear mounted on said lead screw and including lost motion means having a first position to permit rotation of said lead screw and a second position to stop said rotation through said lost motion means, and control linkage means to shift said stop means, said transducer element, and said switch means, substantially simultaneously between said two positions, sound being recorded by said medium in said firsst position and sound being reproduced therefrom in said second position, said lead screw being advanced a predetermined angular amount of less than one-half turn by said lost motion means when said control linkage means is moved from said first position to said second position, whereby when said control linkage means is shifted from the second to the first position, said transducer element will be engaged by a succeeding portion of said lead screw thread of less than one-half turn in advance.

8. In a dictating machine having a combination microphone and sound reproducer, a linearly movable recording medium and a transversely movable transducer means to coact with said recording medium, a horizontal lead screw, a transducer element movable vertically into and out of engagement with said lead screw to advance said transducer means, electrical amplifier means having input and output connections, switch means alternatively movable between two positions to connect said combination microphone and sound reproducer with said input or output connections, a first member pivotally mounted to raise and lower said transducer element, clutch means movable alternatively into and out of engagement with said lead screw, and pivotal linkage means to connect said clutch means and said switch means with said first member, whereby when said transducer element is alternatively raised or lowered, said clutch means and said switch means will be respectively alternatively moved.

9. In a dictating machine having a combination microphone and sound reproducer, a linearly movable recording medium, a transversely movable transducer means to coact with said recording medium, a horizontal lead screw, a transducer element movable vertically into and out of engagement with said lead screw to advance said transducer means, electrical amplifier means having input and output connections, switch means alternatively movable between two positions to connect said combination microphone and sound reproducer with said input or output connections, a first member pivotally mounted on said lead screw shaft to raise and lower said transducer element, a second member slidably mounted on said shaft and movable radially thereof to alternatively stop or release rotation of said shaft, means to connect said second member and said switch means for simultaneous alternative movement thereof, and cam means actuated by said first member to alternatively actuate said second member.

10. The invention as defined in claim 9, wherein said clutch means includes a toothed wheel rotatable with said lead screw shaft, said second member having a portion adapted to engage with said teeth.

11. The invention as defined in claim 10, wherein said toothed wheel is yieldably connected with said shaft to permit a predetermined angular displacement thereof when second member is engaged therewith.

12. The invention as defined in claim 9, wherein said means to connect said second member and said switch means comprises a third member, and said cam means comprises a projection provided in one of said three members adapted to engage a slotted portion provided in another of said three members.

13. The invention as defined in claim 12, wherein said third member is movable about a fixed pivot and is pivotally connected with said second member and with said switch means, said connections being spaced from said fixed pivot.

14. The invention as defined in claim 13, wherein said pivotal connection between said second and third members is yieldable in one direction to permit said third member to actuate said switch means before second member engages with said toothed wheel.

15. The invention as defined in claim 14, wherein said yieldable connection comprises a slot provided in second member, a pin connected to said third member to be received in said slot, and spring means to urge said pin towards one end of said slot.

16. In a dictating machine, a chassis, a driving motor, a recording arm having a stylus, an apertured disk record supporting turntable located under said stylus, a vertical spindle for said turntable, means connected to said motor for driving said turntable, a horizontal lead screw having V-threads under said turntable operatively driven from said spindle, said recording arm having a depending member provided with a bottom knife edge for engaging in the V-threads of said lead screw, a bumper carried by said depending member, said lead screw having a face cam at one end having an inclined surface matching the pitch of said lead screw, to be engaged by said bumper to serve as a stop for said bumper when said arm is moved outwardly to starting position, whereby said recording arm will be advanced for recording immediately when said knife edge is lowered into said lead screw.

17. The invention as defined in claim 16, in which said face cam is adjustably secured to said lead screw.

18. In a dictating machine, a chassis, a driving motor, a recording arm having a stylus, an apertured disk record supporting turntable located under said stylus, said turntable having a central driving spindle, means connected to said motor for driving said turntable, a lead screw beneath said turntable and driven by said spindle, said lead screw having a ratchet wheel loosely mounted thereon and having a lost motion connection therewith, means to stop the rotation of said ratchet wheel when said machine is changed from recording to playback, said lost motion mechanism being operative to allow said lead screw to continue to rotate through a 45 degree angle, after which the rotation of said lead screw will also be stopped.

References Cited in the file of this patent

UNITED STATES PATENTS

| 2,272,905 | Conrad et al. | Feb. 10, 1942 |
| 2,528,190 | Thayer | Oct. 31, 1950 |
| 2,553,392 | Van Eps | May 15, 1951 |
| 2,611,620 | Runge | Sept. 23, 1952 |
| 2,685,772 | Proctor | Aug. 10, 1954 |
| 2,756,287 | Gregory | July 24, 1956 |

UNITED STATES PATENT OFFICE

CERTIFICATE OF CORRECTION

Patent No. 2,952,747            September 13, 1960

Donald F. Balmer et al.

It is hereby certified that error appears in the printed specification of the above numbered patent requiring correction and that the said Letters Patent should read as corrected below.

Column 1, line 32, for "the" read -- to --; column 2, line 9, for "fragmetnary" read -- fragmentary --; column 3, line 32, for "perventing" read -- preventing --; column 4, line 27, for "this" read -- This --; column 9, line 17, for "firsst" read -- first --.

Signed and sealed this 11th day of April 1961.

(SEAL)
Attest:
ERNEST W. SWIDER
Attesting Officer

ARTHUR W. CROCKER
Acting Commissioner of Patents